United States Patent [19]

Pall

[11] 4,228,012
[45] Oct. 14, 1980

[54] END CAP COUPLER SYSTEM FOR LINKING ONE FILTER CARTRIDGE TO ANOTHER FILTER CARTRIDGE OR FUNCTIONAL MEMBER

[75] Inventor: David B. Pall, Roslyn Estates, N.Y.

[73] Assignee: Pall Corporation, Glen Cove, N.Y.

[21] Appl. No.: 954,813

[22] Filed: Oct. 26, 1978

[51] Int. Cl.$^2$ .................... B01D 27/00; B01D 29/24
[52] U.S. Cl. .................... 210/238; 210/323 T;
220/319; 285/DIG. 22
[58] Field of Search .......... 210/232, 238, 322, 323 R,
210/323 T; 220/319; 285/365, 407, DIG. 22

[56] References Cited

U.S. PATENT DOCUMENTS

| | | | |
|---|---|---|---|
| 2,479,580 | 8/1949 | Marco | 285/365 X |
| 2,859,876 | 11/1958 | Brundage | 210/323 T |
| 3,246,920 | 4/1966 | Pall | 210/322 |
| 3,344,923 | 10/1967 | Pall et al. | 210/323 R X |
| 3,494,466 | 2/1970 | Rose et al. | 210/232 |
| 3,669,474 | 6/1972 | Bode | 285/365 X |
| 3,696,962 | 10/1972 | Fehres et al. | 220/319 |
| 3,940,008 | 2/1976 | Flanders | 220/319 X |
| 3,959,147 | 5/1976 | Oakley et al. | 210/323 T |
| 4,043,917 | 8/1977 | Rowley et al. | 210/323 T |
| 4,105,562 | 8/1978 | Kaplan et al. | 210/323 T X |

FOREIGN PATENT DOCUMENTS 2225129 12/1973 Fed. Rep. of Germany ....... 210/323 T

Primary Examiner—Robert H. Spitzer

[57] ABSTRACT

An end cap coupler system for linking one end-capped filter cartridge to another at the end cap thereof or to another functional member is provided, comprising, in combination:

(1) first and second attaching members, each having first and second opposed faces,
  (a) a first face of each attaching member facing one end of a filter cartridge or another functional member; and
  (b) a second face of each attaching member being adapted for closely-abutting contact with the second face of the other attaching member;
(2) an outer periphery of the second face terminating in an outwardly extending flange, the flange of each member being adapted for closely-abutting contact when the second faces of each member are in closely-abutting contact;
(3) at least two intermeshing clamping channel members having channel sides shaped to embrace the abutting flanges of the attaching members and spaced apart sufficiently to engage the flanges and clamp the attaching members together; each channel member having intermeshing locking means engaging mating locking means of the other member and releasably locking the channel members together in such clamping and embracing position;

whereby each of the first and second attaching members when a part of or attached to one end cap of an end-capped filter cartridge releasably links the filter cartridge to an end cap of another end-capped filter cartridge or to another functional member.

54 Claims, 7 Drawing Figures

END CAP COUPLER SYSTEM FOR LINKING ONE FILTER CARTRIDGE TO ANOTHER FILTER CARTRIDGE OR FUNCTIONAL MEMBER

Filter cartridges are normally provided in a tubular configuration, with the open ends of the tube closed off by end caps, at least one of which has a central aperture for passage of fluid therethrough into the interior of the filter element. Such filter cartridges can be arranged for flow of fluid either from the outside-in or the inside-out of the filter cartridge, and they necessarily are of fixed dimensions, because of the need to sealingly attach the end caps to the ends of the filter tube in a fluid-tight seal.

When it is necessary to provide flexibility in filter capacity, this flexibility can be achieved by fabricating the filter cartridges as modular elements, which are adapted to be linked together end-to-end to form an array of any desired number of modular units, thus extending the filter capacity according to the number of modular units linked together. Such arrays require a coupler for linking the filter cartridges together, and this coupler necessarily must link them together in a manner that prevents leakage across the coupler, by-passing the filter element. The coupler must absolutely separate the interiors and the exteriors of the cartridges, so that there can be no fluid flow thereacross except through the filter elements. Such arrays may also require a closure member for closing off the interiors of the cartridges at one end, and a linking member for attaching the array to a filter assembly housing or support.

Such arrays of modular filter elements have been assembled together by various guiding, retaining and attaching means, such as guide rails, center support rods, clamps, and nuts and bolts, to hold the units of the array in position. Careful fabrication and manipulation of parts is required to fit, assemble and take apart such arrays. It is usually not possible to replace individual filter elements in the array without disassembling the entire array, and it is very difficult to assemble such arrays in a manner which prevents leakage between abutting filter elements of the array.

U.S. Pat. No. 3,246,920, patented Apr. 19, 1966 to David B. Pall, provides a coupler capable of linking conventional filter elements and other types of fluid conduits of any dimensions by a simple press fit. The coupler comprises an annular body member having an upper and a lower face, a plurality of gripping members projecting from each face, and gripping means associated therewith for engagement with end portions of the fluid conduits, such as end caps of filter elements, to couple such portions against each face and thus to each other through the coupler. The gripping members and means are of dimensions to hold the end portions against the faces of the coupler body member in a manner to form a fluid-tight seal. The annular passage of the body member is aligned by the gripping members with the central openings in the end caps of the coupled fluid conduits, for passage of fluid therebetween.

The cross-sectional configuration of the body member is closed, and for ease of sealing against leakage is preferably congruent with that of the end portions of the fluid conduits to which it is coupled. Such closed cross-sectional configurations can be symmetrical or asymmetrical, such as for instance, circular, oval, elliptical, polygonal, such as star-shaped, square, rectangular, and triangular, and the sides thereof may be straight or curved.

The gripping members are preferably at least three in number, spaced opposedly and evenly with respect to each other, and are sufficiently resilient to permit radial displacement thereof for engagement and disengagement of the gripping means with the end portions. Resiliency can be obtained by use of resilient materials, and by appropriate dimensioning of the members to avoid rigidity. The members can take any of a variety of configurations, such as legs, lugs, arcuate walls extending over a substantial arc of the annular opening of the body member, or a slitted tubular extension of the body member.

This gripping coupler has posed problems in use, since it tends to develop leaks between filter elements in the course of time, and does not absolutely prevent shifting of the filter elements in the array under high differential pressure across the array, with the resulting development of leaks between elements in the array.

In accordance with the invention an end cap coupler system for linking one end-capped filter cartridge to another filter cartridge at the end cap thereof or to another functional member, such as a closure or a linking member for attachment to a filter assembly housing or support, is provided, which avoids such difficulties. This coupler is adapted for use either as a separate coupler unit for attachment to the end caps of the filter cartridges or other functional member to be linked together, or in components as a part of the end caps of modular filter cartridges or functional members.

The end cap coupler in accordance with the invention, comprises, in combination:
(1) first and second attaching members, each having first and second opposed faces,
  (a) a first face of each attaching member facing one end of a filter cartridge or another functional member; and
  (b) a second face of each attaching member being adapted for closely-abutting contact with the second face of the other attaching member;
(2) an outer periphery of the second face terminating in an outwardly extending flange, the flange of each member being adapted for closely-abutting contact when the second faces of each member are in closely-abutting contact;
(3) at least two intermeshing clamping channel members having channel sides shaped to embrace the abutting flanges of the attaching members and spaced apart sufficiently to engage the flanges and clamp the attaching members together; each channel member having intermeshing locking means engaging mating locking means of the other member and releasably locking the channel members together in such clamping and embracing position; whereby each of the first and second attaching members when a part of or attached to one end cap of an end-capped filter cartridge releasably links the filter cartridge to an end cap of another end-capped filter cartridge or to another functional member.

Modular end-capped filter cartridges are thus provided having one end cap with the first attaching member and the other end cap with the second attaching member adapted to be linked to corresponding members on another end-capped filter cartridge or to another functional member by the intermeshing clamping channel members when embracing the flanges of the two attaching members.

The first and second attaching members can each be components of end caps of modular filter cartridges or functional members which are intended to be assembled in an array, one attaching member being a component part of one end cap of the filter cartridge or functional member and the other attaching member being a component part of the other end cap of the filter cartridge or functional member. Two modular filter cartridges equipped with such end caps or one filter cartridge and one functional member can then be fitted together by putting one end cap having the first attaching member into abutting contact with the end cap or functional member having the second attaching member, and linking the end cap or caps and thus the cartridges or functional members together with the intermeshing clamping channel members embracing the flanges of the attaching members of each separate end cap or functional member and clamping the attaching members together. In this way, any number of such modular filter elements and/or functional members can be linked together end to end to form an array, and can easily be assembled or disassembled simply by attaching or removing the intermeshing clamping channel members.

The intermeshing locking means of the clamping channel members can take any shape or configuration. In a preferred type, each mating locking means is provided at each end with a clamping tip and a recess beside the tip, the clamping tip of each locking means fitting in the recess of the other locking means. Each cooperating locking means is sufficiently flexible at the tip end that the clamp of the tip can be snapped in place over the tip of the other, entering the recess, from which it cannot thereafter be released until flexed away sufficiently to permit the clamp tip to pass over the clamp tip of the other clamping member.

As a further feature, the attaching members of the couplers can be provided with lugs and mating recesses locking the members and thereby the couplers against rotation with respect to each other, so that rotational movement applied at any portion of the array rotates the entire array. This facilitates installation of the array in a filter assembly housing or support, for example.

Preferred embodiments of the end cap coupler of the invention and filter cartridges and functional members embodying the same are shown in the drawings, in which.

Figure 4:
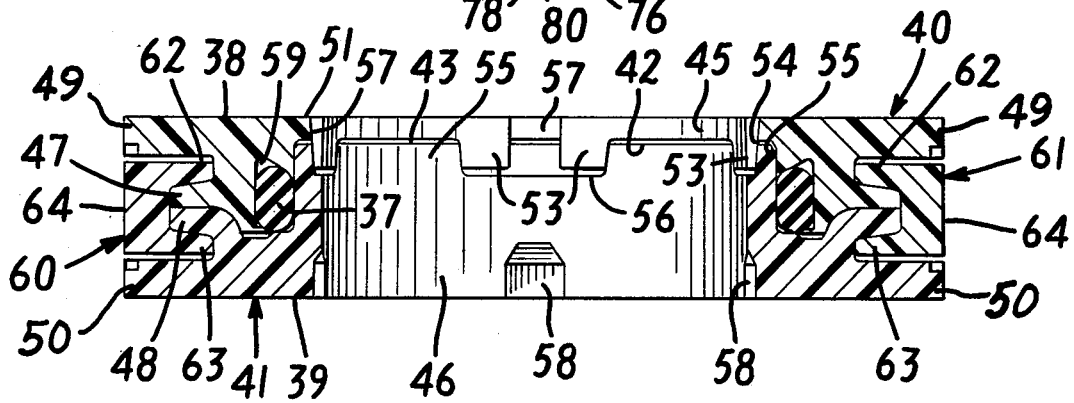
FIG. 4 represents a cross-sectional view through the end cap coupler of FIG. 3, taken along the line 4—4, and looking in the direction of the arrows.
Figure 5:
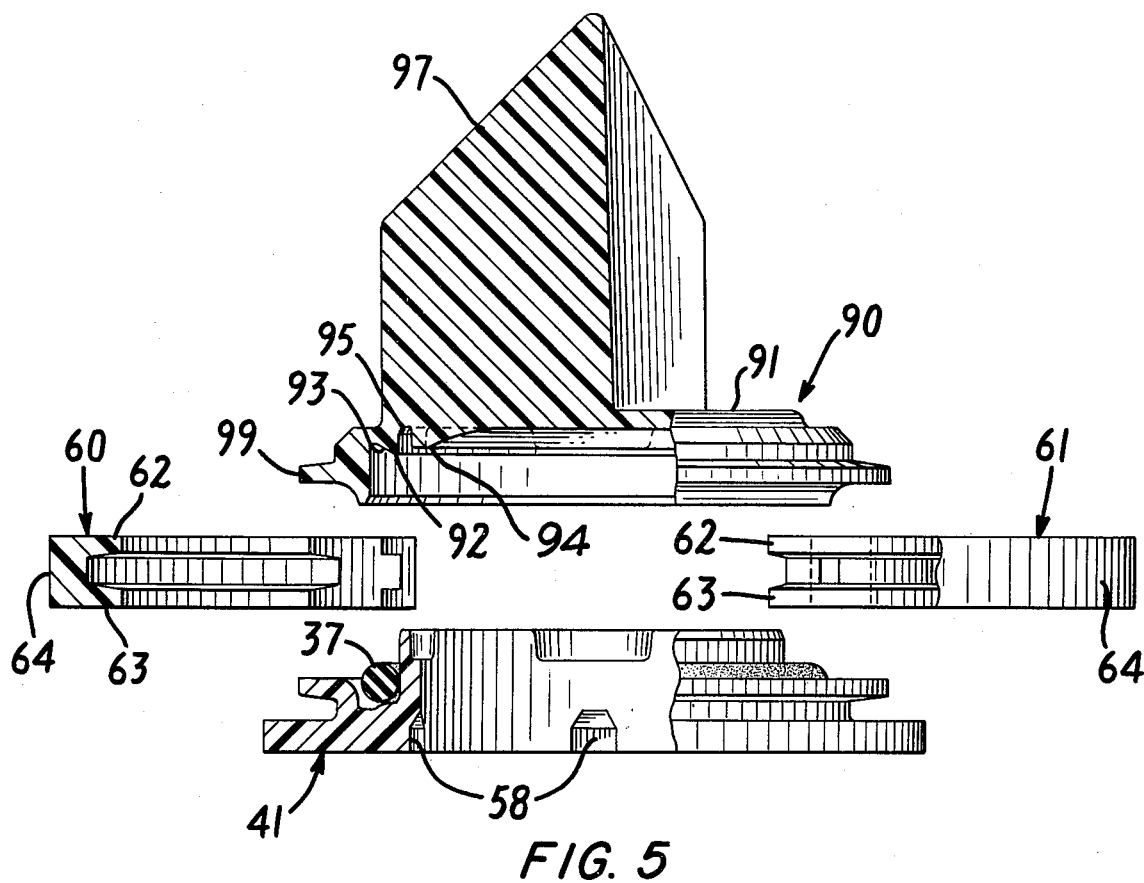
FIG. 5 shows an exploded view of another embodiment of end cap coupler of the invention, in which one of the attaching members is a component part of another functional member, in this case, a closure for one end of a filter array.
Figure 6:
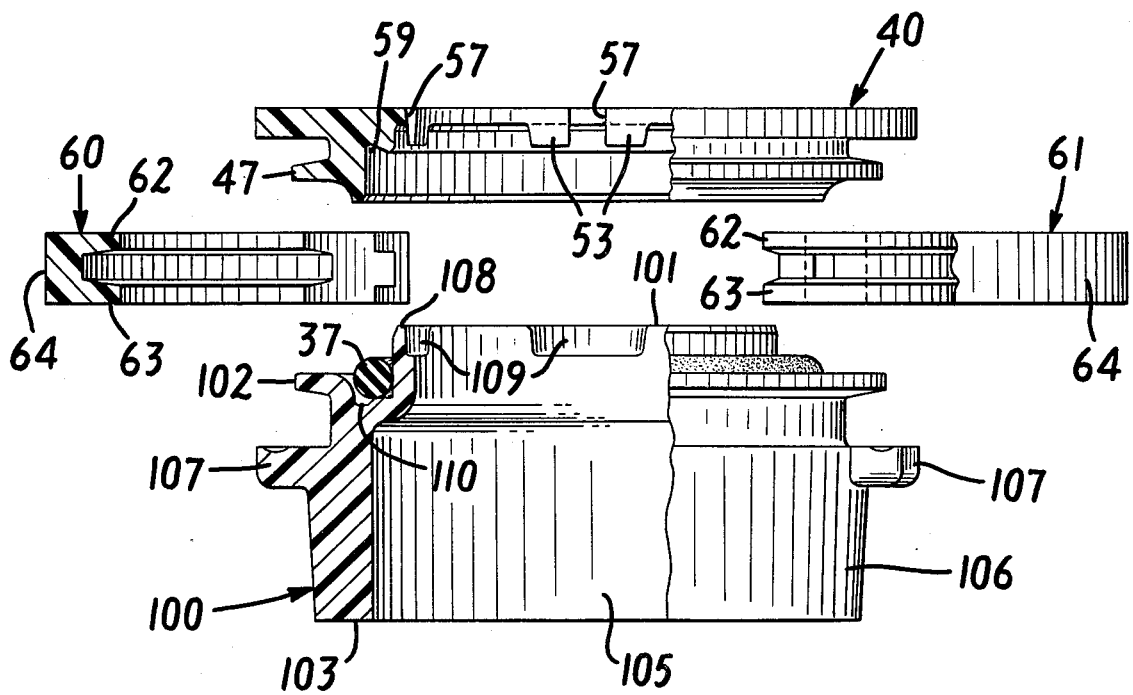
Figure 7:
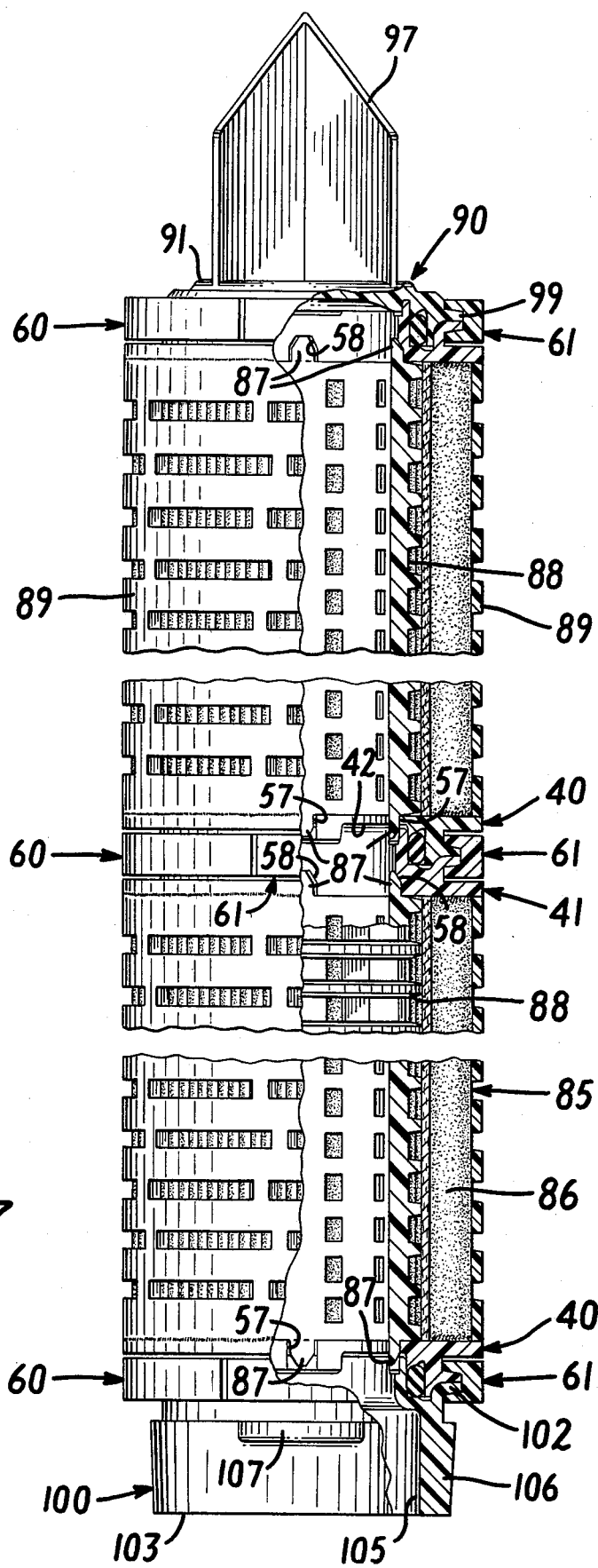

FIG. 6 represents an exploded view of another embodiment of end cap coupler of the invention in which one of the attaching members is a component part of another functional member, in this case a linking member with a bayonet joint for attaching one end of a filter array to a filter assembly housing; and FIG. 7 shows a modular filter cartridge array embodying the end cap couplers of FIGS. 3, 4, 5 and 6, utilizing the attaching members as component parts of the end caps, which are provided with central openings of the cartridges.

The end cap coupler of the invention can be made of any inert material which is substantially nonreactive with and insoluble in the liquid to be used in the fluid system and which is sufficiently flexible and resilient to permit the attachment and separation of the intermeshing tips of the clamping channel members in and out of locking engagement, while at the same time sufficiently rigid to retain the coupled end caps of the filter cartridges or other functional members in fluid-tight relationship. Each of the first and second attaching members and the intermeshing clamping channel members can be of unitary cast or molded construction.

A variety of materials can be used, such as metals, synthetic resins, and cellulose derivatives. Exemplary are aluminum, nickel, chromium alloy, titanium alloy, stainless steel and similar stainless alloys; rubber, fluorocarbon rubber, neoprene, butyl rubber, acrylonitrile rubber; polytetrafluoroethylene, polyethylene, polypropylene, polyisobutylene, polyoxymethylene, polyvinyl chloride, polyvinylidene chloride, polycarbonate, polyester, polyamide, polyimide, polysulfone, polyethersulfone and polysulfonimide resins; cellulose acetate, cellulose acetate butyrate, and ethyl cellulose. Thermoplastic synthetic resins and cellulose derivatives are preferred.

The end cap coupler can be used to connect together any type of end-capped filter cartridge, by bonding the attaching members to or integrating them with the end caps of the cartridges to be attached. One attaching member is fixed to one end cap of one filter cartridge, and the other attaching member is fixed to one end cap of the other filter cartridge. Each attaching member has a central aperture in couplers in the interior of the array; at one end of the array the attaching member can be closed off, or a closure attached as one embodiment of functional member. Consequently, the attaching members linked together in each coupler communicate the interior portions of the filter cartridges to which that coupler is attached, for through flow among the interiors of the filter cartridges in the array. The array is attached to the filter housing or support at one end, for delivery of fluid flow to or from the interior of the array. If desired, this can be by the intermediary of a linking unit, as another embodiment of functional member.

The attaching members of the end caps of the filter cartridges and other functional members can be constructed of any conventionally used material which is substantially nonreactive with and insoluble in the liquid to be used in the fluid system. To facilitate the attachment of the attaching members of the coupler to the end cap, or other functional member, they are preferably made of the same or closely similar and compatible materials. Adhesives and bonding agents can be used. If the end caps or other functional member and the attaching member of the coupler are each of the same or compatible thermoplastic materials, the components can be heat-bonded (fused, sintered, or melt-bonded) together, or solvent-bonded together, to form a unitary piece, thus ensuring the obtention of a permanent fluid-tight seal between the two.

Alternatively, the attaching members can be a component part of one or both end caps or other functional members, as shown in the embodiments of FIGS. 3 to 7. In this event, one attaching means of the end cap coupler per se is a part of the outer face of the end cap or other functional member, and the intermeshing clamping channel members effectively link the end caps and/or functional members together directly, via the attaching members, thus eliminating a leakage path therebetween. Accordingly, any of the materials suggested above for the end cap coupler can also be used for the end caps of the filter cartridge, and the other functional members.

In all embodiments, whenever the intermeshing clamping channel members embrace the flanges of the attaching members and clamp the attaching members together, the abutting faces of the attaching members are brought together in a fluid-tight seal, thus preventing leakage through the coupler between the attaching members. To ensure a fluid-tight seal, a gasket or sealing ring can be placed therebetween, as shown in the embodiments of the drawings.

The attaching members can be provided with mating recesses and/or projecting members on each face, so as to lock them together in fixed relative positions, and prevent rotational movement relative to each other. This makes it possible to rotate the entire array as one unit, which is advantageous in installation and removal of the array from a filter unit, for example. The attaching members and clamping members can also be provided with means grasped by a device for rotation of the array, and for prying the clamping members away from locking engagement, in separating the filter cartridges.

The end cap coupler of the invention provides for easy and rapid engagement end-to-end by a press fit, and detachment by a pull or pry, of the end caps of modular filter elements or other functional member in a simple, effective and inexpensive coupling. There is no need for special structures in the filter cartridge or other functional member, nor are manual adjustments required. The coupler is self-locking when press-fitted into place. In fact, by appropriate selection of material and shape, the coupler can be designed to cushion the end caps of the cartridges or other functional member and protect them from abrading contact with each other, thus reducing wear and damage. Maintenance and cleaning of the filter units in the array is greatly facilitated, since the filter is made up of a number of smaller sectional filter elements, instead of one large, cumbersome and expensive one, of which the individual components can be replaced separately without disassembling or replacing the entire array.

Figure 1:
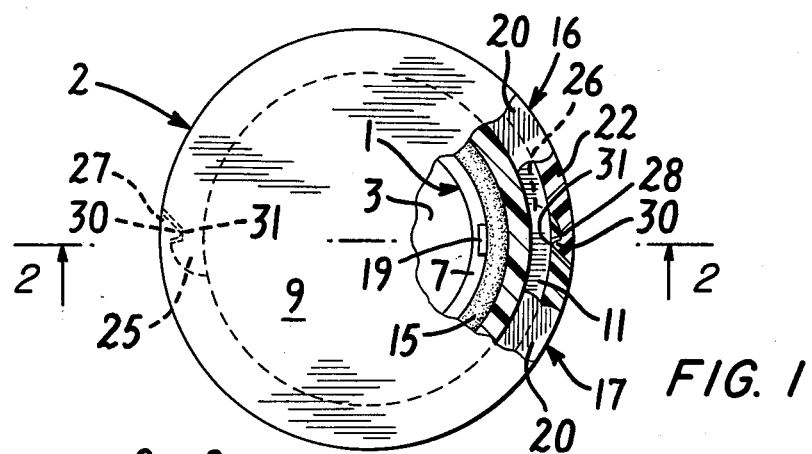
FIG. 1 represents a top view of an end cap coupler in accordance with the invention.
Figure 2:
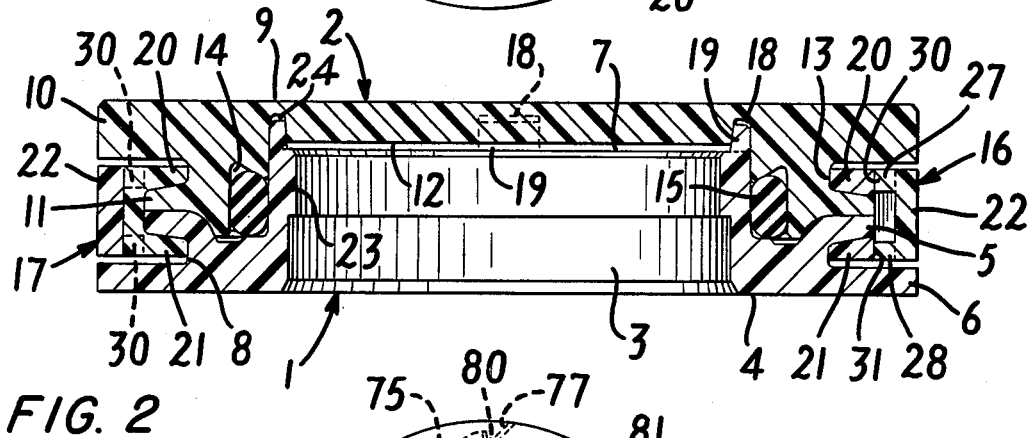
FIG. 2 represents a cross-sectional view through the end cap coupler of FIG. 1, taken along the line 2—2, and looking in the direction of the arrows.

In the embodiment shown in FIGS. 1 and 2, the end cap coupler is a thin disc, circular in configuration, and has first and second attaching members 1, 2, each of polyester resin (polyethylene terephthalate). The member 1 is provided with a central opening 3 for passage of fluid therethrough, while the member 2 is closed, thus suiting this coupler for location at one end of an array, to close off the end. For use between filter cartridges as in FIG. 7, or at any end of the array with a line connection to the interior of the array, as in FIG. 6, both members 1, 2 would have central openings 3, thus linking up the interiors of the filter cartridges in the array, from one adjacent filter cartridge to the next, via the coupler.

The first attaching member 1 has an outer face 4 adapted for attachment to an end cap of one filter cartridge, and flanges 5, 6 extending outwardly from the outer face 4 and the inner face 7 and defining a recess 8 therebetween.

The second attaching member 2 has an outer face 9 adapted for attachment to an end cap of another filter cartridge, and flanges 10, 11. The flanges 10, 11 extend outwardly from the outer face 9 and the inner face 12 of the attaching member, defining a recess 13 therebetween. There is also a recess 14 in the inner face 12 for reception of O-ring 15.

Inward of the recess 14 on the inner face of member 2 are a plurality of recesses 18 (in this case, four, distributed evenly at 90° intervals about the face), receiving a like member of projections 19 on the inner face 7 of member 1 (in this case, four, distributed evenly at 90° intervals about the face). These key the members 1, 2 in fixed locked positions, and prevent relative rotation of the members.

The attaching members 1, 2 are held together by the intermeshing clamping channel members 16, 17, which each extend over a slightly more than 180° arc of the 360° circumference of the attaching members. Each of the channel members have channel sides 20, 21 which fit into the recesses 8, 13 of the attaching members 1, 2. The web 22 of the channel sides closely approximates the total span of the flanges 6, 11 of the attaching members 1, 2, with the result that when the channel members are in the position shown in FIGS. 1 and 2 (as best seen in FIG. 2), the attaching members are clamped closely together by the channel members.

The O-ring seal 15 projects slightly beyond the recess 14, and is consequently compressed in sealing relationship in the recess 14 when the first attaching member 1 is clamped against the second 2 by the intermeshing channel members 16, 17. As seen in FIG. 2, the recess 14 is tapered, and the member 1 has a guide flange 23 keyed to recess 24 of member 2 so as to ensure that the attaching members can be brought together in alignment and in sealing contact, compressing the O-ring 15 in the recess 14, and thus effect the desired fluid-tight seal therebetween, sealing off the interiors of the cartridges from the exteriors.

As seen in FIG. 1, each intermeshing clamping channel member 16, 17 has a tip 25, 26 at one end provided with a clamp adapted to engage a mating clamp 27, 28 on the tip of the other member. Each clamp has a projecting lug 30, the outer face of which is at an angle of 45° and the inner face of which is at an angle of 15° to the center line of the channel member. The lug 30 is adapted to engage a recess 31 between the tip 30 and the main portion of the channel member. The projecting tips lock in the recesses so that when the channel members are brought together, the lugs snap over each other, into the recesses, and are held together by each other in the recesses. Because of the inherent flexibility of the polyester resin of which the channel members are made, the lugs pass over each other into locking engagement without difficulty, in a snap fit, but they can be released only by a slight displacement of the tips, thus preventing accidental release, and requiring a prying action or a strong pull to separate them.

While the overriding lug-and-recess or detent type of clamping member is illustrated in the Figures, any other type of locking engagement can be used that provides a similar snap-fit, such as, for example, a spring detent, a retractable spring-mounted poppet, a ball-and-socket, and the like.

The end cap coupler is easily assembled; it is merely necessary to bring the two attaching members into abutting contact and then snap the intermeshing clamping sides of the channel members over the flanges of the attaching members, and the clamping tips over each other, producing the assembly shown in FIGS. 1 and 2. The assembly can be disassembled by prying the clamping members apart, using a screw driver tip or a knife blade, after which they snap out, and the members can then be removed and the attaching members separated.

The end cap coupler of FIGS. 1 and 2 is adapted for permanent attachment to the end caps of two filter cartridges. The outer face of the first attaching member is fixed to one end of one cartridge, and the outer face of the second attaching member is fixed to one end cap of the other cartridge. The two attaching members are then brought into abutment, and the clamping channel members snapped into place thereover, as indicated above, to link the cartridges together. The filter cartridges are separated by snapping the clamping tips of the channel members out of locking engagement, removing the channel members, and then separating the end caps.

Figure 3:
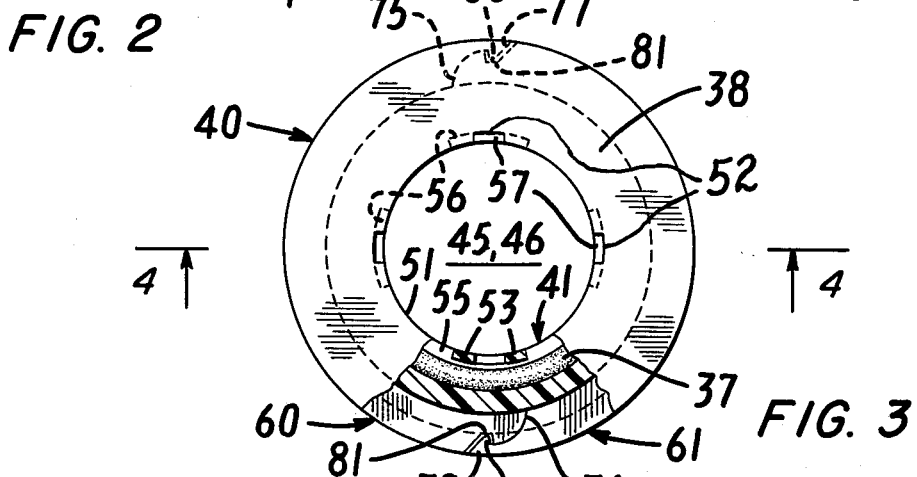
FIG. 3 shows a top of another embodiment of end cap coupler of the invention, in which the attaching members are component parts of end caps.

Another embodiment of the invention in which the end cap couplers are integral parts of end caps of modular filter elements is shown in FIGS. 3 and 4.

In the embodiment shown in FIGS. 3 and 4, the coupler is a component part of the outer faces 38, 39 of two end caps 40, 41, which are shaped for attachment on the inner face 42, 43, respectively, to a tubular filter element, producing the cartridges shown in FIG. 7.

Both end caps 40, 41 are of polyester resin (polyethylene terephthalate), and are annuli shaped at their faces 38, 39 with an outwardly extending peripheral flange 47, 48, respectively, serving as an attaching member, and at their faces 42, 43, for attachment as an end cap to one end of a filter cartridge. Each end cap 40, 41, is provided with a central opening 45, 46 for passage of fluid therethrough, thus suiting this coupler for use between filter cartridges, as in FIG. 7.

The faces 42, 43 of the end caps 40, 41 have an outwardly extending peripheral flange 49, 50. Face 42 has an inwardly extending peripheral flange 51 with four apertures 52 therethrough; a pair of axially extending lugs 53 at each side of the apertures 52; and a peripheral recess 54. Face 43 has an axially extending collar 55 with four recesses 56 receiving the lugs 53 and locking to the cap 40 thereby. There are four recesses 57, 58 in the faces 42, 43 for reception of corresponding lugs in a filter core, as seen in FIG. 7.

The lugs 53 and recesses 54, 57, 58 are each at 90° spacings from each other, and key the end caps 40, 41 to the filter core and to each other in fixed locked positions, and prevent relative rotation of the end caps and filter cartridges in the array.

The inner side of face 43 has a circumferential recess 59 between the collar 55 and the attaching member 39 for reception of an O-ring seal 37 or like sealing member.

The end caps 40, 41 are held together by the intermeshing clamping channel members 60, 61, which each extend over a slightly more than 180° arc of the 360° circumference of the flanges 47, 48. Each of the channel members have channel sides 62, 63 which fit over the flanges 47, 48. The web 64 of the channel sides closely approximates the total span of the flanges 47, 48, with the result that when the channel members are in the position shown in FIG. 4, the end caps and flanges are clamped closely together at their outer faces by the channel members.

The O-ring seal 37 projects slightly beyond the recess 59, and is consequently compressed in sealing relationship in the recess 59 when the end cap 40 is clamped against the end cap 41 by the intermeshing channel members 60, 61. As seen in FIG. 4, the recess 59 is tapered, and the lugs 53 keyed to recesses 56 to ensure that the attaching members can be brought together in alignment and in sealing contact, compressing the O-ring 37 in recess 59, and thus effect the desired fluid-tight seal therebetween, sealing off the interiors of the cartridges from the exteriors.

As seen in FIG. 3, each intermeshing clamping channel member 60, 61 has a tip 75, 76 at one end provided with a clamp adapted to engage a mating clamp 77, 78 on the tip of the other member. Each clamp has a projecting lug 80, adapted to engage the recess 81 between the tip 80 and the main portion of the channel member. The projecting tips lock in the recesses so that when the channel members are brought together, the lugs snap over each other, into the recesses, and are held together by each other in the recesses. Because of the inherent flexibility of the polyester resin of which the channel members are made, the lugs pass over each other without difficulty, in a snap fit, but they can be released only by a slight displacement of the tips, thus preventing accidental release, and requiring a prying action or a strong pull to separate them.

While the overriding lug-and-recess or detect type of clamping member is illustrated in the Figures, any other type of locking engagement can be used that provides a similar snap-fit, such as, for example, a spring detent, a retractable spring-mounted poppet, a ball-and-socket, and the like.

The end cap coupler of FIGS. 3 and 4 is easily assembled; it is merely necessary to bring the two end caps into abutting contact, and then snap the intermeshing clamping sides of the channel members over the flanges 47, 48, and the clamping tips over each other, producing the assembly shown in FIGS. 3 and 4. The assembly can be disassembled by prying the clamping members apart, using a screw driver tip or a knife blade, after which they snap out, and the members can then be removed and the attaching members separated.

The end cap coupler of FIGS. 3 and 4 via caps 40, 41 are adapted for permanent attachment as one or both end caps of the same or different filter cartridges.

If two end caps of different filter cartridges are to be linked, then two caps are needed, one of the type of cap 40 fixed as an end cap of one cartridge, and the other of the type of cap 41 fixed as end cap of the other cartridge. This is the embodiment shown in FIG. 7. If one of each type are affixed to each filter cartridge, the cartridges are adapted to be linked end to end, head to tail. If the same type of cap is affixed to a filter cartridge, then the two types of cartridges have to be linked alternately in series sequence.

In assembly the caps of the two types 40, 41 are brought into flange-to-flange abutment, and the clamping channel members snapped into place thereover, as indicated above, to link the cartridges together.

The filter cartridges are separated by snapping the clamping tips of the channel members out of locking engagement, removing the channel members, and then separating the end caps.

In the embodiment shown in FIG. 5, the end cap coupler has a closure member 90 shaped for attachment to an end cap of the type of end cap 41 which is the same as in FIGS. 3 and 4. The closure closes off one end of an array of filter cartridges, as shown in FIG. 7.

The closure 90 is a thin solid disc, circular in configuration, of polyester resin (polyethylene terephthalate), shaped at its outer periphery as an attaching member 99, and at its inner face 91 for attachment to an end cap of the type of 41 at one end of a filter cartridge. The face 91 is provided with a ridge 92, a recess 93 inward of the recess for reception of an O-ring seal 37 and a raised central portion 94 with four recesses 95 at 90° spacing for reception of the lugs 53 of an end cap 41.

The outer face 91 of closure 90 is provided with a three-sided spike 97, for locating and fixing the array in a filter housing.

The recesses 95 key the closure 90 to the end cap 41 in a fixed locked position, and prevent relative rotation of the closure.

The closure 90 and end cap 41 are held together by the intermeshing clamping channel members 60, 61, which each extend over a slightly more than 180° arc of the 360° circumference of the flanges 47, 99. Each of the channel members have channel sides 62, 63 which fit over the flanges 47, 99. The web 64 of the channel sides closely approximates the total span of the flanges 47, 99, with the result that when the channel members are in the position shown in FIG. 5, the end caps and flanges are clamped closely together at their outer faces by the channel members.

The O-ring seal 37 projects slightly beyond the recess 59, and is consequently compressed in sealing relationship in the recesses 59, 93 when the end cap 41 is clamped against the closure 90 by the intermeshing channel members 60, 61. As seen in FIG. 4, the recess 59 is tapered, and the lugs 53 of cap 41 keyed to recesses 95 of closure 90 ensure that the attaching members can be brought together in alignment and in sealing contact, compressing the O-ring 37 in the recess, and thus effect the desired fluid-tight seal therebetween, sealing off the interiors of the cartridge at the end of the array.

In other respects, the coupler of FIG. 5 is identical to that of FIGS. 3 and 4, so no further description is needed.

The closure member of FIG. 5 is easily assembled to the end of the array. It is merely necessary to bring the closure and the end cap into abutting contact, and then snap the intermeshing clamping sides of the channel members over the flanges 47, 99, and the clamping tips over each other, producing the assembly shown in FIG. 5. The assembly can be disassembled by prying the clamping members apart, using a screw driver tip or a knife blade, after which they snap out, and the members can then be removed and the attaching members separated.

In the embodiment shown in FIG. 6, the coupler has a linking member 100 for attachment to an end cap of the type of end cap 40, which is the same as shown in FIGS. 3 and 4. The link is designed to attach an array of the cartridges shown in FIG. 7 to filter assembly. The linking member 100 is an annulus, circular in configuration, of polyester resin (polyethylene terephthalate), shaped at its inner face 101 with a flange 102 serving as an attaching member, and at its face 103 for attachment to the assembly. The other member 100 is provided with a central opening 105 for passage of fluid therethrough from the interiors of the array into the assembly, and form a fluid-tight seal with the assembly, thus linking up the interiors of the filter cartridges in the array with the fluid line via the coupler, as seen in FIG. 7.

The outer side 106 of the member 100 is provided with two outwardly extending lugs 107 for locating and fixing the array in a bayonet-type matching socket in a filter housing.

The inner face 101 of the member 100 has an axially extending collar 108 with four recesses 109 on the inside of its outer end receiving lugs 53 of an end cap type of end cap 40. There is also a circumferential recess 110 in the face 101 for reception of O-ring 37. The four recesses 109 are at 90° spacings from each other, and key the linking member 100 to the end cap 40 in a fixed locked position, and prevent relative rotation of the cartridges in the array with respect to the linking member.

The linking member 100 and end cap 40 are held together by the intermeshing clamping channel members 60, 61, which each extend over a slightly more than 180° arc of the 360° circumference of the flanges 47, 102. Each of the channel members have channel sides 62, 63 which fit over the flanges 47, 102. The web 64 of the channel sides closely approximates the total span of the flanges 47, 102, with the result that when the channel members are in the position shown in FIG. 6, the end caps and flanges are clamped closely together at their outer faces by the channel members.

The O-ring seal 37 projects slightly beyond the recess 59 and is consequently compressed in sealing relationship in the recesses 59, 110 when the end cap 40 is clamped against the member 100 by the intermeshing channel members 60, 61. As seen in FIG. 6, the recess 54 is tapered, and the member 100 has the recesses 109 keyed to lugs 53 of cap 40, so as to ensure that the attaching members can be brought together in alignment and in sealing contact, compressing the O-ring 37 in the recess 59, and thus effect the desired fluid-tight seal therebetween, sealing off the interiors of the cartridges from the exteriors at the link to the filter assembly.

In other respects the coupler of FIG. 6 is identical to that of FIGS. 3 and 4, so no further description is needed.

The coupler of FIG. 6 is easily assembled; it is merely necessary to bring the linking member and end cap into abutting contact, and then snap the intermeshing clamping sides of the channel members over the flanges 47, 102, and the clamping tips over each other, producing the assembly shown in FIG. 6. The assembly can be disassembled by prying the clamping members apart, using a screw driver tip or a knife blade, after which they snap out, and the members can then be removed and the attaching member separated.

The filter cartridges of FIG. 7 each are provided with a filter element 85 such as a corrugated membrane filter sheet 86 of polyamide supported on the upstream and downstream sides by rigid core 88 and sheath 89 of extruded plastic netting. The core 88 has four axial lugs 87 that engage the recesses 57, 58 of faces 42, 43, and sheath 89 has similar lugs that are sacrificially embedded in faces 42, 43, being melt-bonded to the caps 40, 41 by softening the cap material on the inner face and then plunging the end of the cartridge into the soft melt, and allowing it to harden.

It will be apparent from the above description and drawings that various modifications of the attaching members and the intermeshing clamping channel members can be made. For example, more than two intermeshing clamping channel members can be used, if desired, extending over less than 180° arcs. An arrangement with three, four or more such channel members, extending over 120°, 90°, etc., arcs, is perfectly satisfactory. However, for simplicity and ease of attachment and disassembly of the attaching members together, two clamping channel members are quite sufficient.

In place of an O-ring seal in a recess in one attaching member as shown, a gasket can be arranged between the abutting inner faces 7, 12 of the attaching members 1, 2, for example, in a recess between the flanges 6, 11 of the attaching members. There can be recesses in each inner face, if desired, to secure proper seating of the gasket in the desired place on the attaching member.

If desired, the attaching members can be removably attached to the end caps of modular filter elements, for example, by a threaded or bayonet-type joint, although this is not normally desirable, because it provides an additional possible leakage path, in the event of wear and excessive differential pressure across the filter element of the filter cartridges.

Having regard to the foregoing disclosure, the following is claimed as inventive and patentable embodiments thereof:

1. A slide-on end cap coupler for linking an end-capped filter cartridge to another end-capped filter cartridge or to another functional member at the end cap thereof, comprising, in combination:
   (1) first and second attaching members, each having first and second opposed faces,
     (a) a first face of each attaching member facing one end of a filter cartridge or other functional member; and
     (b) a second face of each attaching member being adapted for closely-abutting contact with the second face of the other attaching member;
   (2) an outer periphery of the second face terminating in an outwardly extending flange, the flange of each member being adapted for closely-abutting contact when the second faces of each member are in closely-abutting contact;
   (3) at least two intermeshing clamping channel members having channel sides shaped to slidably move into and away from a clamping position in which the sides circumferentially embrace the abutting flanges of the attaching members and spaced apart sufficiently to engage the flanges and clamp the attaching members together; each channel member having intermeshing locking means engaging mating locking means of the other member and releasably locking the channel members together in such clamping and embracing position; and in such position embracing substantially the entire periphery of the flanges; whereby each of the first and second attaching members when a part of or attached to one end cap of an end-capped filter cartridge releasably and slidably links the filter cartridge to an end cap of another end-capped filter cartridge or to another functional member.

2. An end cap coupler according to claim 1 in which the attaching members each have interconnecting apertures for fluid flow therethrough, and the functional member is a closure closing off the interconnected apertures at one end thereof.

3. An end cap coupler according to claim 1 in which the attaching members each have interconnecting apertures for fluid flow therethrough and the functional member is a linking member for connecting the coupler to a filter assembly.

4. An end cap coupler according to claim 1 in which the attaching members each have interconnecting apertures for fluid flow therethrough and each attaching member is a part of an end cap for an end-capped filter cartridge.

5. An end cap coupler according to claim 1 in which the attaching members each have interconnecting apertures for fluid flow therethrough and each attaching member is for attachment to an end cap of an end-capped filter cartridge.

6. An end cap coupler according to claim 1, in which the attaching and clamping members are of thermoplastic polymeric material.

7. An end cap coupler according to claim 6 in which the thermoplastic resinous material is a polyester resin.

8. An end cap coupler according to claim 1 in which the intermeshing locking means of the channel member comprises a clamping tip and recess engaging a recess and clamping tip of the mating locking means.

9. An end cap coupler according to claim 8 in which the outer face of the tip is at an angle of 45° and the inner face of the tip at the recess is at an angle of 15° to the center line of the clamping means.

10. An end cap coupler according to claim 1, in which the contacting faces of the first and second attaching members are keyed to maintain them in fixed relative positions with respect to each other.

11. An end cap coupler according to claim 10 in which the key comprises lugs on one attaching member engaging recesses on the other attaching member.

12. A slide-on end cap coupler for linking two end-capped filter cartridges together at the end caps thereof, comprising, in combination:
   (1) first and second attaching members, each having first and second opposed faces, the outer periphery of each face terminating in an outwardly extending flange, the flanges defining a peripheral recess therebetween open at its outer side;
     (a) a first face of each attaching member being shaped for attachment as an end cap at one end of a filter cartridge; and
     (b) a second face of each attaching member being adapted for closely-abutting contact with the second face of the other attaching member;
   (2) at least two intermeshing clamping channel members having channel sides shaped to slidably move into and away from a clamping position in which the sides circumferentially embrace the flanges of the attaching members and spaced apart to clamp the attaching members together; each channel member having intermeshing locking means engaging mating locking means of the other member and releasably locking the channel members together in such clamping and embracing position; and in such position embracing substantially the entire periphery of the flanges;
whereby each of the first and second attaching members when a part of or attached to end caps of different end-capped filter cartridges releasably and slidably link the filter cartridges together.

13. An end cap coupler according to claim 12 in which the attaching and clamping members are of thermoplastic polymeric material.

14. An end cap coupler according to claim 13 in which the thermoplastic resinous material is a polyester resin.

15. An end cap coupler according to claim 12 in which the intermeshing locking means of the channel members comprises a clamping tip and recess engaging a recess and clamping tip of the mating locking means.

16. An end cap coupler according to claim 15 in which the outer face of the tip is at an angle of 45° and the inner face of the tip at the recess is at an angle of 15° to the center line of the clamping means.

17. An end cap coupler according to claim 12 in which the contacting faces of the first and second attaching members are keyed to maintain them in fixed relative positions with respect to each other.

18. An end cap coupler according to claim 17 in which the key comprises lugs on one attaching member engaging recesses on the other attaching member.

19. A modular end-capped filter cartridge having a first end cap including one of a first attaching member and a second attaching member mating therewith and a second end cap including one at a first attaching member and a second attaching member mating therewith, and adapted to be linked to a like modular cartridge at an end cap thereof or to another functional member by intermeshing clamping channel members engaging one of the first and one of the second mating attaching members, the first and second attaching members each having outer faces adapted for closely-abutting contact with the outer faces of the first or second members of an end cap of a like modular cartridge or to another functional member; an outer periphery of each outer face terminating in an outwardly extending flange, each flange being adapted for closely-abutting contact when the outer faces are in closely-abutting contact; at least two intermeshing clamping channel members having channel sides shaped to slidably move into and away from a clamping position in which the sides circumferentially embrace the abutting flanges of the first and second mating attaching members and spaced apart sufficiently to engage the flanges and clamp the attaching members together; each channel member having intermeshing locking means engaging mating locking means of the other member and releasably locking the channel members together in such clamping and embracing position; and in such position embracing substantially the entire periphery of the flanges; whereby the modular end-capped filter cartridge is releasably and slidably linked together at an attaching member to another end-capped filter cartridge at the end cap or to another functional member.

20. A modular end-capped filter cartridge according to claim 19 in which the attaching members each have interconnecting apertures for fluid flow therethrough, and the functional member is a closure closing off the interconnected apertures at one end thereof.

21. A modular end-capped filter cartridge according to claim 19 in which the attaching members each have interconnecting apertures for fluid flow therethrough and the functional member is a linking member for connecting the coupler to a filter assembly.

22. A modular end-capped filter cartridge according to claim 19 in which the attaching members each have interconnecting apertures for fluid flow therethrough and each attaching member is a part of an end cap for an end-capped filter cartridge.

23. A modular end-capped filter cartridge according to claim 19 in which the attaching members each have interconnecting apertures for fluid flow therethrough and each attaching member is for attachment to an end cap of an end-capped filter cartridge.

24. A modular end-capped filter cartridge according to claim 19 in which the attaching and clamping members are of thermoplastic polymeric material.

25. A modular end-capped filter cartridge according to claim 24 in which the thermoplastic resinous material is a polyester resin.

26. A modular end-capped filter cartridge according to claim 19 in which the intermeshing locking means of the channel members comprises a clamping tip and recess engaging a recess and clamping tip of the mating locking means.

27. A modular end-capped filter cartridge according to claim 26 in which the outer face of the tip is at an angle of 45° and the inner face of the tip at the recess is at an angle of 15° to the center line of the clamping means.

28. A modular end-capped filter cartridge according to claim 19 in which the contacting faces of the first and second attaching members are keyed to maintain them in fixed relative positions with respect to each other.

29. A modular end-capped filter cartridge according to claim 28 in which the key comprises lugs on one attaching member engaging recesses on the other attaching member.

30. A modular end-capped filter cartridge having a first end cap including a first attaching member and a second end cap including a second attaching member adapted to be linked to a like modular cartridge having like end caps at a second end cap including a second attaching member or a first end cap including a first attaching member, respectively, by intermeshing clamping channel members engaging the two attaching members, the first and second attaching members each having outer faces, the outer periphery of which terminates in two outwardly extending flanges defining a peripheral recess therebetween open at its outer side; the outer face and the outer of the two flanges of the attaching members being adapted for closely-abutting contact with the outer faces and the outer of the two flanges of the first or second attaching members of an end cap of a like modular cartridge; at least two intermeshing clamping channel members having channel sides shaped to slidably move into and away from a clamping position in which the sides circumferentially embrace the outer abutting flanges of the first and second attaching members of abutting end caps and spaced apart to engage the flanges and clamp the attaching members of each end cap together; each channel member having intermeshing locking means engaging mating locking means of the other member and releasably locking the channel members together in such clamping and embracing position; and in such position embracing substantially the entire periphery of the flanges; whereby like modular end-capped filter cartridge are releasably and slidably linked together by attaching members of the end caps.

31. A modular end-capped filter cartridge according to claim 30 in which the attaching and clamping members are of thermoplastic polymeric material.

32. A modular end-capped filter cartridge according to claim 31 in which the thermoplastic resinous material is a polyester resin.

33. A modular end-capped filter cartridge according to claim 30 in which the intermeshing locking means of the channel members comprises a clamping tip and recess engaging a recess and clamping tip of the mating locking means.

34. A modular end-capped filter cartridge according to claim 33 in which the outer face of the tip is at an angle of 45° and the inner face of the tip at the recess is at an angle of 15° to the center line of the clamping means.

35. A modular end-capped filter cartridge according to claim 30 in which the contacting faces of the first and second attaching members are keyed to maintain them in fixed relative positions with respect to each other.

36. A modular end-capped filter cartridge according to claim 35 in which the key comprises lugs on one attaching member engaging recesses on the other attaching member.

37. A modular end-capped filter cartridge having a first end cap including a first attaching member and a second end cap including a first attaching member adapted to be linked to a like modular cartridge having a first end cap including a second attaching member and a second end cap including a second attaching member, the second attaching members mating with the first attaching members, and being adapted to be linked together by intermeshing clamping channel members engaging the two attaching members, the first and second attaching members each having outer faces, the outer periphery of which terminates in two outwardly extending flanges defining a peripheral recess therebetween open at its outer side; the outer face and the outer of the two flanges of the attaching members being adapted for closely-abutting contact with the outer faces and the outer of the two flanges of the first and second attaching members; at least two intermeshing clamping channel members having channel sides shaped to slidably move into and away from a clamping position in which the sides circumferentially embrace the outer abutting flanges of the first and second attaching members of abutting end caps and spaced apart to engage the flanges and clamp the attaching members of each end cap together; each channel member having intermeshing locking means engaging mating locking means of the other member and releasably locking the channel members together in such clamping and embracing position; and in such position embracing substantially the entire periphery of the flanges; whereby like modular end-capped filter cartridges are releasably and slidably linked together by attaching members of the end caps.

38. A modular end-capped filter cartridge according to claim 37 in which the attaching and clamping members are of thermoplastic polymeric material.

39. A modular end-capped filter cartridge according to claim 38 in which the thermoplastic resinous material is a polyester resin.

40. A modular end-capped filter cartridge according to claim 37 in which the intermeshing locking means of the channel members comprises a clamping tip and recess engaging a recess and clamping tips of the mating locking means.

41. A modular end-capped filter cartridge according to claim 40 in which the outer face of the tip is at an angle of 45° and the inner face of the tip at the recess is at an angle of 15° to the center line of the clamping means.

42. A modular end-capped filter cartridge according to claim 37 in which the contacting faces of the first and second attaching members are keyed to maintain them in fixed relative positions with respect to each other.

43. A modular end-capped filter cartridge according to claim 42 in which the key comprises lugs on one attaching member engaging recesses on the other attaching member.

44. An array of a plurality of modular end-capped filter cartridges, each having a first and second end cap including one of a first attaching member and a second attaching member and linked to a like modular cartridge having like end caps with first and second attaching members, the first attaching members mating with the second attaching members, and being linked together by intermeshing clamping channel members engaging the two attaching members, the first and second attaching members each having outer faces adapted for closely-abutting contact with the outer faces of the first or second attaching members of like end caps of a like modular cartridge; an outer periphery of each outer face terminating in an outwardly extending flange, each flange being adapted for closely-abutting contact when the outer faces are in closely-abutting contact; at least two intermeshing clamping channel members having channel sides shaped to slidably move into and away from a clamping position in which the sides circumferentially embrace the abutting flanges of the first or second attaching members of abutting end caps and spaced apart sufficiently to engage the flanges and clamp the attaching members of each end cap together; each channel member having intermeshing locking means engaging mating locking means of the other member and releasably locking the channel members together in such clamping and embracing position; and in such position embracing substantially the entire periphery of the flanges; whereby the modular end-capped filter cartridges are releasably and slidably linked together in the array by the attaching members of the end caps.

45. An array of a plurality of modular end-capped filter cartridges according to claim 44 in which the attaching members each have interconnecting apertures for fluid flow therethrough, and at one end of the array is a closure closing off the interconnected apertures at one end thereof.

46. An array of a plurality of modular end-capped filter cartridges according to claim 44 in which the attaching members each have interconnecting apertures for fluid flow therethrough and at one end of the array is a linking member for connecting the array to a filter assembly.

47. An array of a plurality of modular end-capped filter cartridges according to claim 44 in which the attaching members each have interconnecting apertures for fluid flow therethrough and each attaching member is a part of an end cap for an end-capped filter cartridge.

48. An array of a plurality of modular end-capped filter cartridges according to claim 44 in which the attaching members each have interconnecting apertures for fluid flow therethrough and each attaching member is for attachment to an end cap of an end-capped filter cartridge.

49. An array of a plurality of modular end-capped filter cartridges according to claim 44 in which the attaching and clamping members are of thermoplastic polymeric material.

50. An array of a plurality of modular end-capped filter cartridges according to claim 49 in which the thermoplastic resinous material is a polyester resin.

51. An array of a plurality of modular end-capped filter cartridges according to claim 44 in which the intermeshing locking means of the channel members comprises a clamping tip and recess engaging a recess and clamping tip of the mating locking means.

52. An array of a plurality of modular end-capped filter cartridges according to claim 51 in which the outer face of the tip is at an angle of 45° and the inner face of the tip at the recess is at an angle of 15° to the center line of the clamping means.

53. An array of a plurality of modular end-capped filter cartridges according to claim 44 in which the contacting faces of the first and second attaching members are keyed to maintain them in fixed relative positions with respect to each other.

54. An array of a plurality of modular end-capped filter cartridges according to claim 53 in which the key comprises lugs on one attaching member engaging recesses on the other attaching member.

* * * * *